United States Patent [19]

Norder et al.

[11] Patent Number: 5,029,020
[45] Date of Patent: Jul. 2, 1991

[54] SCANNER WITH SLOW SCAN IMAGE CONTEXT PROCESSING

[75] Inventors: Paul D. Norder, Rochester; Jagdish C. Tandon, Fairport; Ying-wei Lin, Penfield; Anthony F. Calarco, Fairport, all of N.Y.

[73] Assignee: Xerox Corporation, Stamford, Conn.

[21] Appl. No.: 437,730

[22] Filed: Nov. 17, 1989

[51] Int. Cl.$^5$ .............................................. H04N 1/04
[52] U.S. Cl. .................................. 358/474; 358/483; 358/494
[58] Field of Search .............. 358/474, 494, 483, 482, 358/486, 456

[56] References Cited

U.S. PATENT DOCUMENTS

| | | | |
|---|---|---|---|
| 3,886,371 | 5/1975 | Lloyd | 358/474 |
| 4,409,625 | 10/1983 | Ogasawara | 358/288 |
| 4,413,287 | 11/1983 | Torpie et al. | 358/288 |
| 4,433,346 | 2/1984 | Stoffel et al. | 358/456 |
| 4,823,195 | 4/1989 | Ito | 358/285 |
| 4,916,551 | 4/1990 | Lin et al. | 358/483 |

Primary Examiner—Joseph A. Orsino
Assistant Examiner—Thomas D. Lee
Attorney, Agent, or Firm—Frederick E. McMullen

[57] ABSTRACT

A scanner-printer of the type that scans and prints in blocks, each block consisting of a preset number of image lines, in which the block of lines scanned by the scanning array is larger than the block of lines printed by a printing array so that there is provided additional image scan lines before and after each block of image lines printed, the additional image scan lines providing image context data for use in processing image signals adjacent the boundaries between blocks of image lines.

3 Claims, 7 Drawing Sheets

SCANNER WITH SLOW SCAN IMAGE CONTEXT PROCESSING

The invention relates to a scanner of the type that scans images in blocks of several lines at once, and more particularly to an improved scanner with slow scan image context processing.

To achieve high quality reproduction in electronic printers, different ways of processing the image signals that are used to reproduce the original can be used. Such processing can include, for example, screen removal, screening, 2-dimensional enhancement, etc. However, many processes such as screen removal, to be effective, rely on the use of a context of pixels in both the fast scan and the slow scan directions. In scanners of the type that scan the image in segments or blocks, image processing is necessarily limited to functions which do not require knowledge of the pixel values of lines from the adjoining blocks. However, it may nevertheless be desirable and even necessary to perform processing steps of the type which require the use of a context of pixels, even though to do so requires relatively expensive memory for storing the requisite number of lines. But while information about scan lines processed in the preceding block of image lines can be retained in memory until needed for image processing, this does not solve the need to have information about the scan lines in the next block of as yet unprocessed image lines at hand to provide the necessary pixel context.

In the prior art, U.S. Pat. No. 4,823,195 to Ito discloses a recording apparatus of the type that exemplifies the problem addressed by the present invention. Ito discloses an apparatus in which combined reader and printer heads are scanned together across a document and a copy sheet to process the image lines block by block. As each scan is completed, the document and copy sheet are stepped ahead in synchronization with one another by a distance equal to the width of the block of lines scanned. Since the process practiced by the Ito apparatus is carried out block by block, the context of pixels required for certain image signal processing functions as, for example, descreening, screening, etc., is not available. U.S. Pat. Nos. 4,409,625 to Ogasawara and 4,413,287 to Torpie et al both disclose scan ahead systems for facsimile machines designed to speed up the fax process and reduce the amount of data transmitted. For this, both Ogasawara and Torpie et al provide scanners, which scan not only the image line being transmitted, but also pre-scan several lines ahead to see if the coming lines contain image data. Where no image data is detected by the pre-scan, the lines are skipped by the reader and not transmitted. Where, however, image data is discovered by the pre-scan, the lines are scanned in the normal fashion when reached by the line scanning segment of the scanner.

In contrast, the present invention provides a scanner enabling slow scan context image processing, comprising: a scanning array adapted to repeatedly scan an image in segments, each of the segments being equal to a predetermined number of lines, the segments including a first block of lines to be processed flanked by second and third blocks of lines on each side of the first block of lines, the second block of lines comprising a preset number of lines preceding the first block of lines, the third block of lines comprising a preset number of lines succeeding the first block lines, the second and third block of lines providing image signal context for processing image signals adjacent the border of the first block of lines with the second and third blocks of lines; and array moving means for moving the scanning array in a first direction paralleling the lines and in a second direction perpendicular to the first direction, the array moving means moving the scanning array in the second direction in increments equal in distance to the first block of lines.

In the ensuing description, "electronic fast scan direction" refers to the direction in which the scanning array (80) scans, "mechanical fast scan direction" refers to the direction perpendicular to the electronic fast scan direction in which the scan carriage (40) moves, and "mechanical slow scan direction" refers to the direction parallel to the electronic fast scan direction in which the scan carriage moves. "Image line" (L) refers to the line parallel to the electronic fast scan direction, while "scan line" (SL) refers to the scan lines parallel to the mechanical fast scan direction.

Referring to FIGS. 1–4 of the drawings, there is shown the scanner, designated generally by the numeral 10, of the present invention which provides slow scan context image processing. Scanner 10 is shown and described herein in combination with a printer, the combination being referred to and identified herein as scanner-printer 12. While a combination scanner-printer is shown and described, scanner 10 may comprise a stand alone scanner usable by itself or in combination with output devices other than a printer such as a facsimile transmitter, memory, communication channel, etc.

Figure 1:
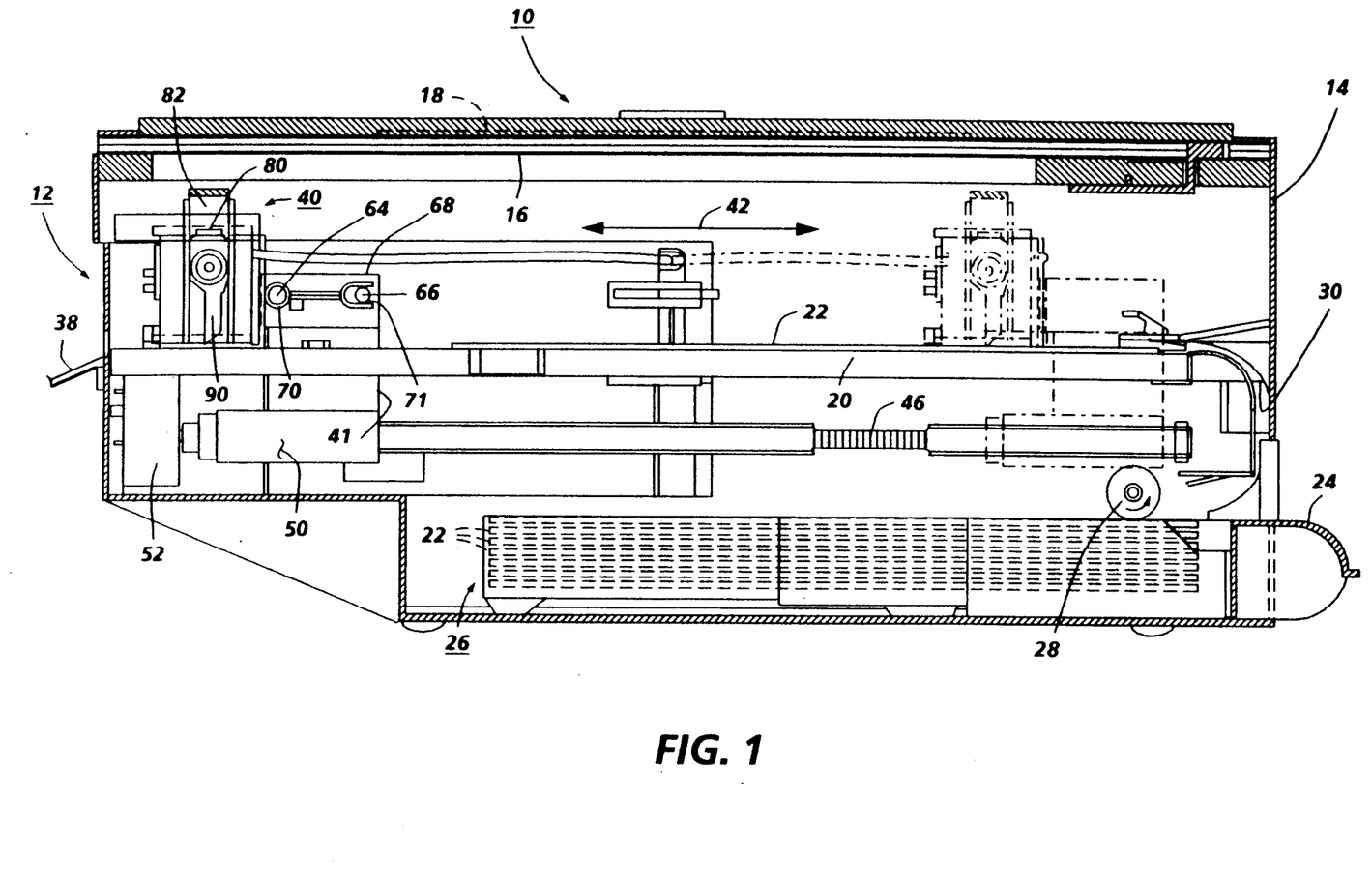
FIG. 1 is a side view of a scanner-printer incorporating the slow scan context image processing of the present invention.

Scanner-printer 12 has a relatively compact generally rectangular frame structure or housing 14, the upper part or side of which forms a generally rectangular transparent glass scan platen 16 of preset size on which the document 18 to be copied is placed. Platen 16 includes a suitable border with registration indicia (not shown) to facilitate placing of document 18 in proper position for copying.

While document 18 is shown and described as being positioned on scan platen 16 manually, it will be understood that a suitable automatic document feeder (not shown) may be used for this purpose.

A print platen 20 is located interiorly of housing 14 in predetermined spaced relation below scan platen 16, print platen 20 being in a plane substantially parallel to that of scan platen 16. Print platen 20, as will appear, serves as a support for the copy substrate material, shown here as copy sheets 22, on which the copy of the document 18 is to be printed. A removable copy sheet source in the form of a paper tray cassette 24 is slidably fitted into a slot-like opening provided in housing 14 below platen 20 adjacent the housing base, cassette 24 having therewithin a stack 26 of copy sheets 22. A sheet feed roll 28 serves, when actuated to feed the topmost copy sheet in stack 26 through a turn-around baffle 30 onto print platen 20. There, the leading edge of the sheet is gripped by a gripper (not shown) on scan-print carriage 40, which is moved to the dotted line position shown in FIG. 1 for this purpose. On return of carriage 40 to the home position, the sheet is pulled by carriage 40 into preset registered position on print platen 20 such that the sheet 22 is located in operative relation with the document 18 on scan platen 16. Following completion of the copy cycle, the trailing edge of the finished copy is engaged by a pusher (not shown) on carriage 40 and discharged into output tray 38 as carriage 40 returns to the home position.

Figure 3:
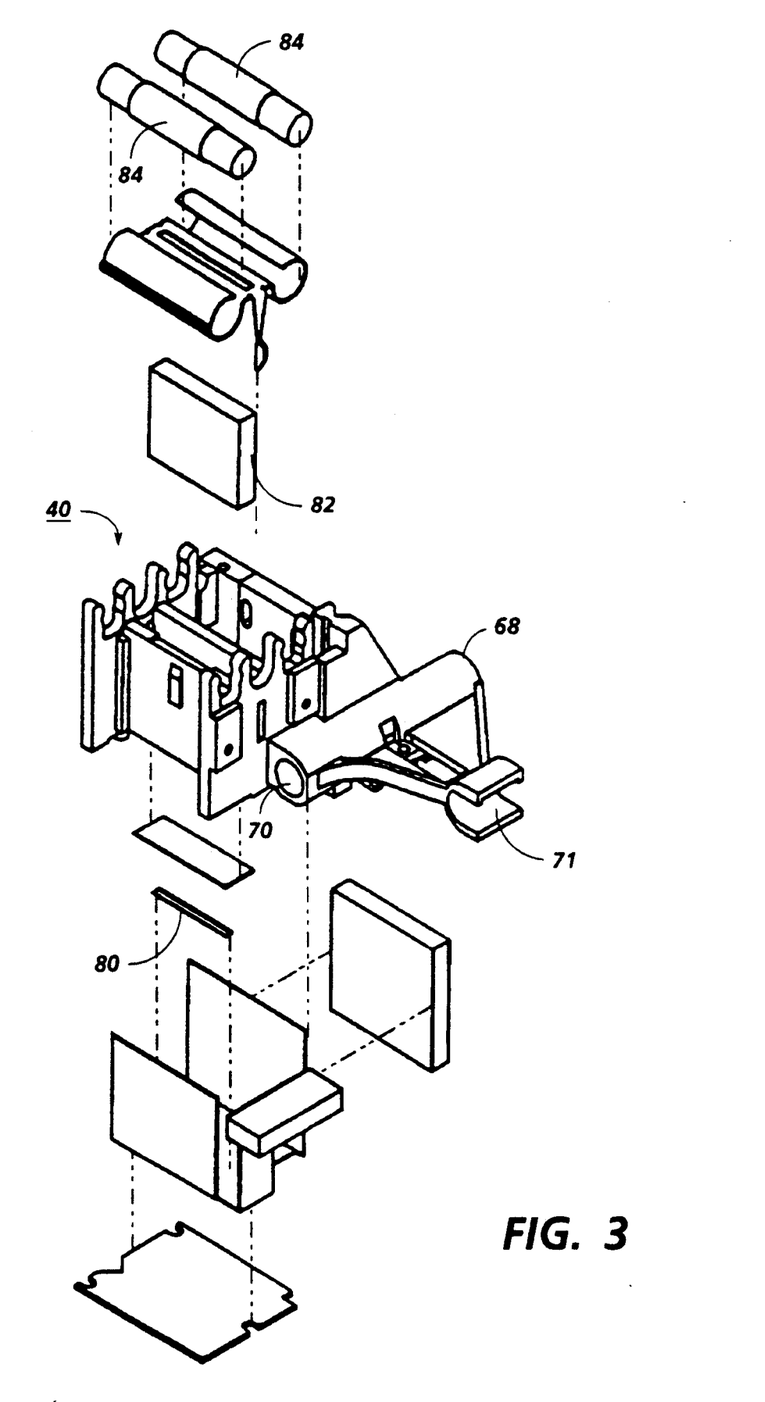
FIG. 3 is an exploded isometric view illustrating the principal parts of the scan-print carriage for the scanner-printer shown in FIG. 1.

A scan-print carriage 40 is supported for scanning movement in both the mechanical fast and slow scan directions in housing 14 between scan and print platens 16, 20 respectively. A base 41 supports carriage 40 for reciprocating back and forth movement in the mechanical fast scan direction (shown by the solid line arrow 42), base 41 itself being supported by lead screw 46 proximate one side of base 41 and a guide 48. Lead screw 46, which is drivingly coupled to base 41 by an internally threaded nut 50, is rotated by reversible motor 52 to selectively move base 41 and the carriage 40 supported thereon back and forth in the mechanical fast scan direction at a controlled step scanning rate.

Carriage 40 is in turn supported on base 41 for reciprocating back and forth movement in the mechanical slow scan direction (shown by the dotted line arrow 62) by means of a cooperating journal rod 64 and support rod 66, carriage 40 having a side extension 68 with suitable openings 70, 71 within which rods 64, 66 are received. Carriage 40 is moved in the mechanical slow scan direction by a drive motor 76 mounted on carriage 40, motor 76 being drivingly coupled to carriage 40 by belt and pulley driver 78.

Figure 4:
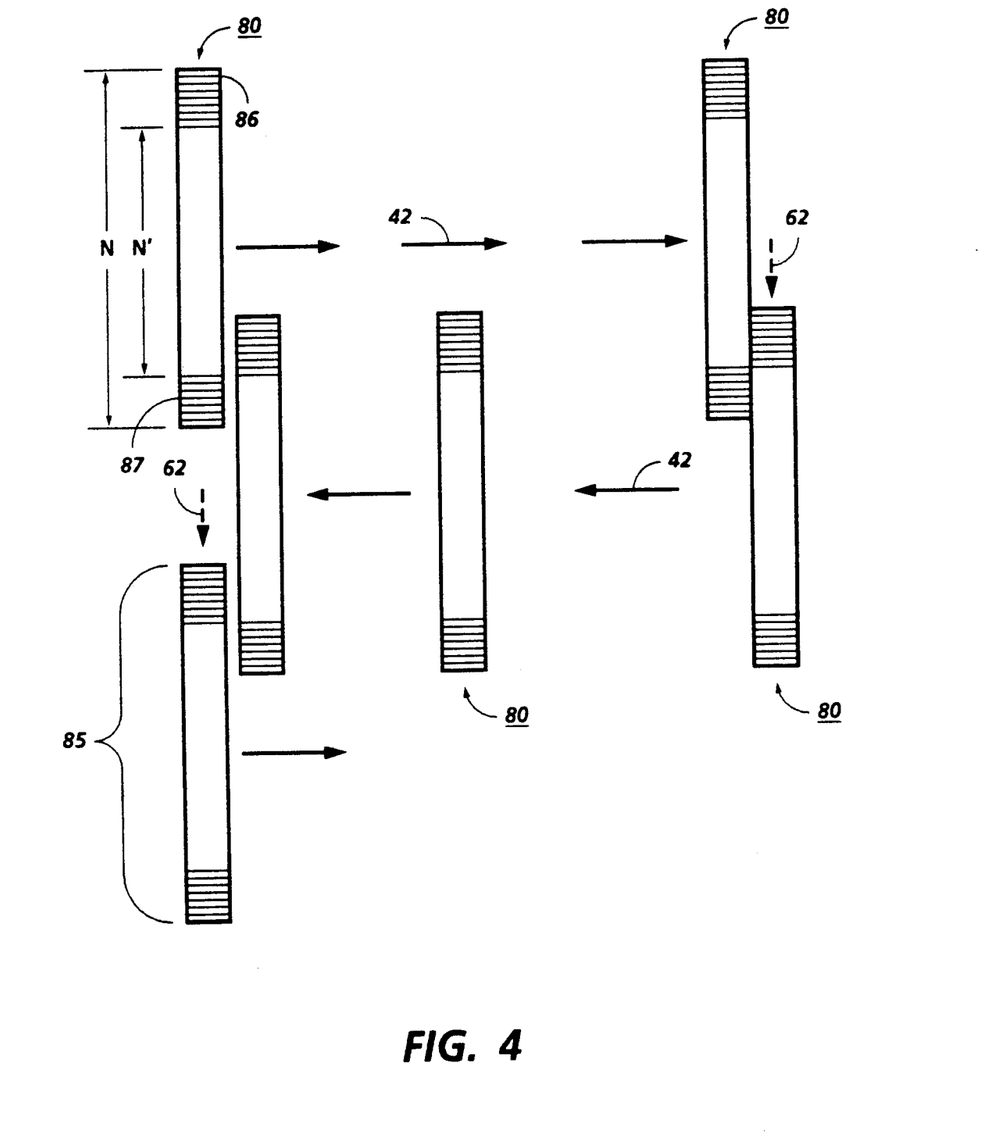
FIG. 4 is a view depicting scanning movement and the scan swath of the scanning array.

To scan and convert the image content of the document 18 on platen 16 into image signals suitable for printing, a linear scanning array 80 such as a CCD having at least one row of photosensors or photosensitive elements is mounted on carriage 40 such that the electronic fast scan direction of array 80 is perpendicular to the mechanical fast scan direction and parallel to the mechanical slow scan direction. A gradient index fiber lens array 82 focuses the individual photosensors or photosensitive elements of array 80 on scan platen 16 and the document resting thereon. Scanning array 80 has a preset number N of photosensors, array 80 together with lens array 82 being sized so as to scan a predetermined number N of pixels P. Because of the vertical orientation of scanning array 80, each scan of array 80 also crosses a like-sized block 85 of N image lines. A lamp pair 84 illuminates the scan line viewed by array 80 through lens array 82. As seen in FIG. 4, scanning array 80 overscans, the number N of pixels P scanned by array 80 being larger than the number N' of pixels processed. As a result, each scan line SL includes an overscanned area 86, 87 at each end, the number of pixels in each overscanned area 86, 87 being equal to $N - N'/2$.

A linear printing array 90 such as a thermal ink jet head, is mounted in carriage 40 below and in alignment with scanning array 80, the axis of printing array 90 also being perpendicular to the fast scan direction. Printing array 90 has a preset number of printer elements, array 90 being sized to print a block of pixels such that the number of pixels printed by array 90 in each print line is equal to the number of pixels processed as discussed above and shown in FIG. 4.

A suitable control system (not shown) with operator control panel for inputting program instructions to scanner-printer 12 is provided.

Figure 2:
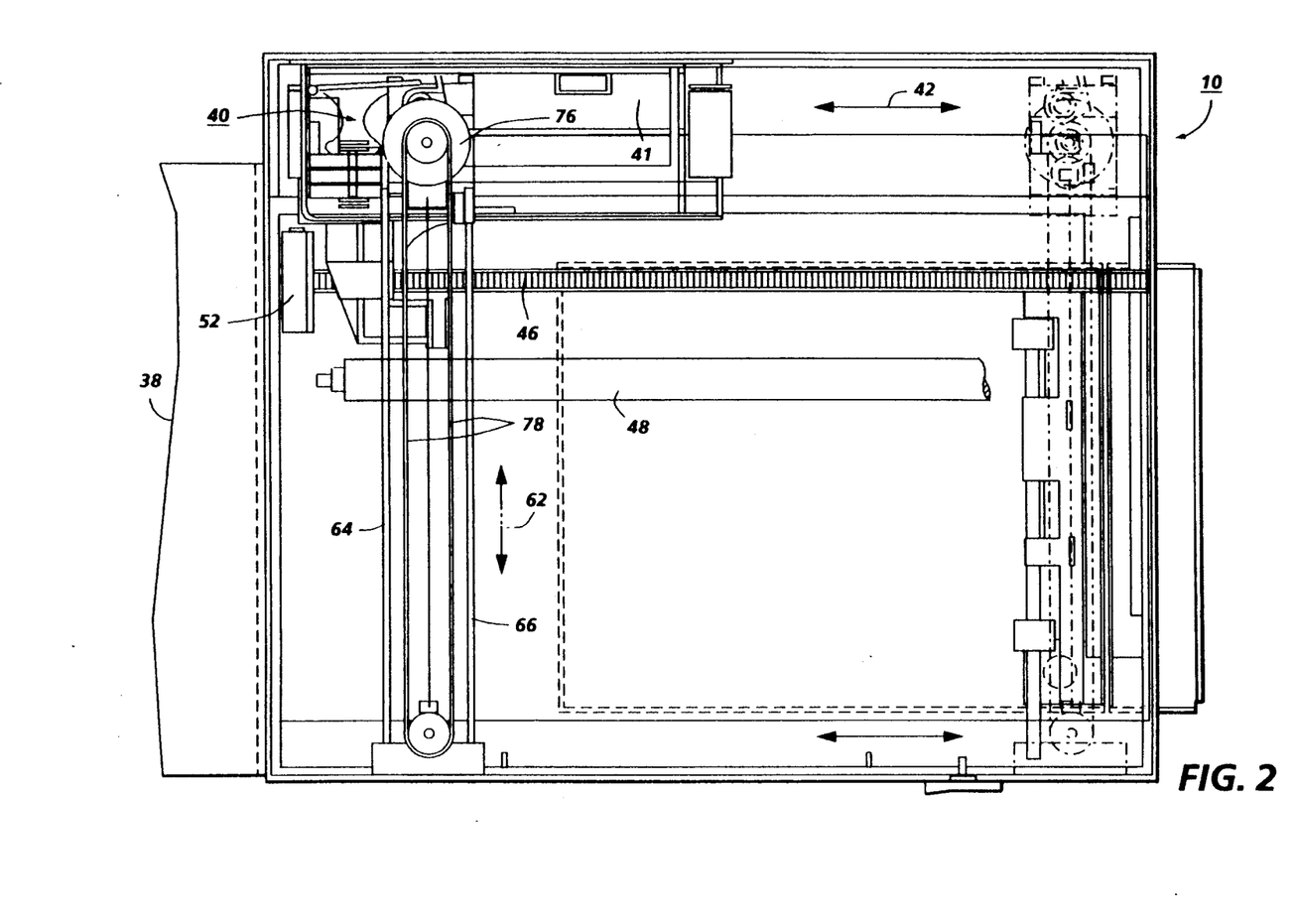
FIG. 2 is a top view of the scanner-printer shown in FIG. 1.

During operation of scanner-printer 12, the document 18 to be copied is placed in registered position on scan platen 16, scan-print carriage 40 being normally parked in the home position shown in FIG. 2 at this point. Where printing is to take place, copy sheet feed roll 28 is actuated to feed a copy sheet 22 and scan-print carriage operated to bring the copy sheet into registered position on print platen 20 with carriage 40 in the home position. Motor 52 is actuated to move carriage 40 in the mechanical fast scan direction (shown by the arrow 42) at a predetermined scanning rate while scanning array 80 is repeatedly actuated to scan N pixels at once. As described, scanning array 80 scans in the electronic fast scan direction.

After the last scan line ($SL_N$) in the current pass (i.e., from scan line $SL_1$ to scan line $SL_N$) is scanned, motor 76 is actuated to move scan carriage 40 downwardly in the mechanical slow scan direction (shown by the dotted line arrow 62) to position scanning array 80 for scanning the next block 85 of image lines. Included in each successive block of image lines are the previously processed pixels in the overscanned area 86.

Motor 52 is actuated to reverse carriage 40 and move scanning array 80 in the opposite direction to scan the next succeeding block 85 of image lines. When completed, motor 76 is actuated to move carriage 40 downwardly to the next block of image lines and the foregoing process repeated until all of document 18 has been scanned.

In scanner printer 12, printing array 80 on carriage 40 may be actuated to substantially simultaneously print the block of image lines scanned by array 80 on the copy sheet 22 resting on print platen 20.

Figure 5:
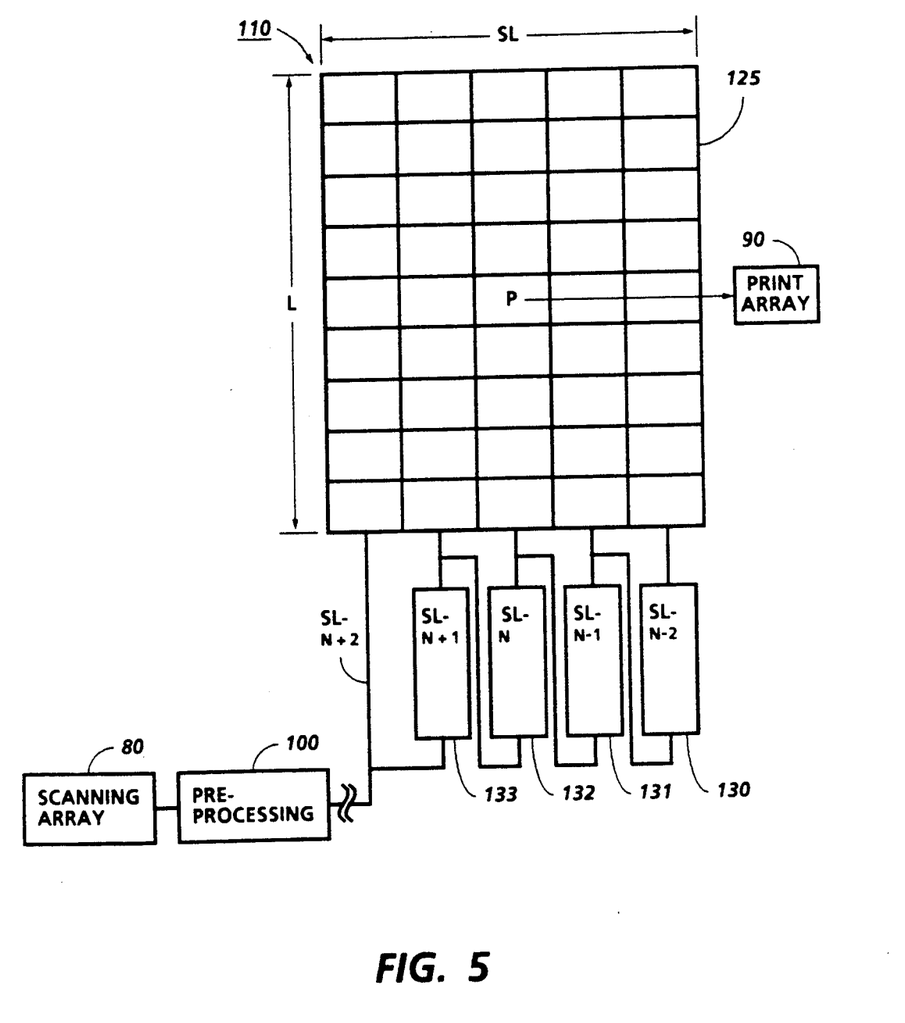
FIG. 5 is a schematic view of the image signal processing path showing details of a descreening filter enabled by the slow scan context image processing of the present invention.

Referring to FIG. 5, in order to process the image signals produced by scanning array 80 for output to a work station (WS) such as, for example, printing array 90 and to enhance the quality and accuracy of the prints made, image signal pre-processing and processing sections 100, 110 respectively are provided. In pre-processing section 100, the analog image signals output by the photosensitive elements of scanning array 80 are converted to multi-bit digital signals or pixels. The image pixels from pre-processing section 100 are input to processing section 110 where various signal processing steps are carried out, such as, for example, resolution conversion, gain correction, filtering, scaling, descreening. As will be understood, however, certain processing steps such as descreening require the use of neighboring image pixels for effective use. These typically include pixels in the same image line and on both sides of the pixel being processed as well as positionally related pixels in one or more of the image lines before and after the pixel being processed. Further, since the images are processed in blocks, care must be taken to assure image continuity between adjoining blocks.

In the example shown and for explanation purposes, processing section 110 includes a programmable FIR descreening filter 125 which is used as a low pass filter to remove high frequency halftones and convert halftone images into continuous tone images. The process, termed screen removal or descreening, is used to eliminate the halftone carrier frequency and higher level harmonics in the image signal input.

In the ensuing description, for explanation purposes, the number N of pixels P scanned by array 80 in each scan line SL is 200 while the number N' of pixels P actually is 192. Accordingly, the block 85 of image lines scanned on each pass (i.e., from scan line $SL_1$ to scan line $SL_N$) is also 200 lines, while the number of image lines processed on each pass is 192 lines. Descreening filter 125 may be a $5 \times 9$ filter five scan lines SL wide and nine pixels P long. Other values and relationships for N and N' may be contemplated as well as other filter systems.

In order to enable processing of the first 4 and the last 4 pixels in each scan line, 4 pixels (i.e., $P_1$, $P_2$, $P_3$, $P_4$) behind the first pixel $P_5$ to be processed (shown as overscanned area 86 in FIGS. 4 and 6a), and 4 pixels (i.e., $P_{193}$, $P_{194}$, $P_{195}$, $P_{196}$) ahead of the last pixel $P_{192}$ to be processed (shown as overscanned area 87 in FIGS. 4 and 6a), are also scanned by scanning array 80.

To provide the neighboring pixels required for descreening, four lines of image pixels from pre-processing section 100 are stored in a four scan line memory, shown in FIG. 5 as four series in/parallel out scan line buffers 130, 131, 132, 133. Buffers 130, 131 hold the two scan lines $SL_{n-2}$ and $SL_{n-1}$ preceding the scan line $SL_n$ being processed, buffer 132 the scan line $SL_n$ being processed, and buffer 133 the first scan line $SL_{n+1}$ following the scan line being processed. The remaining scan line required, i.e., the second scan line $SL_{n+2}$ following the scan line being processed, is obtained in real time directly from pre-processing section 100.

Figure 6A:
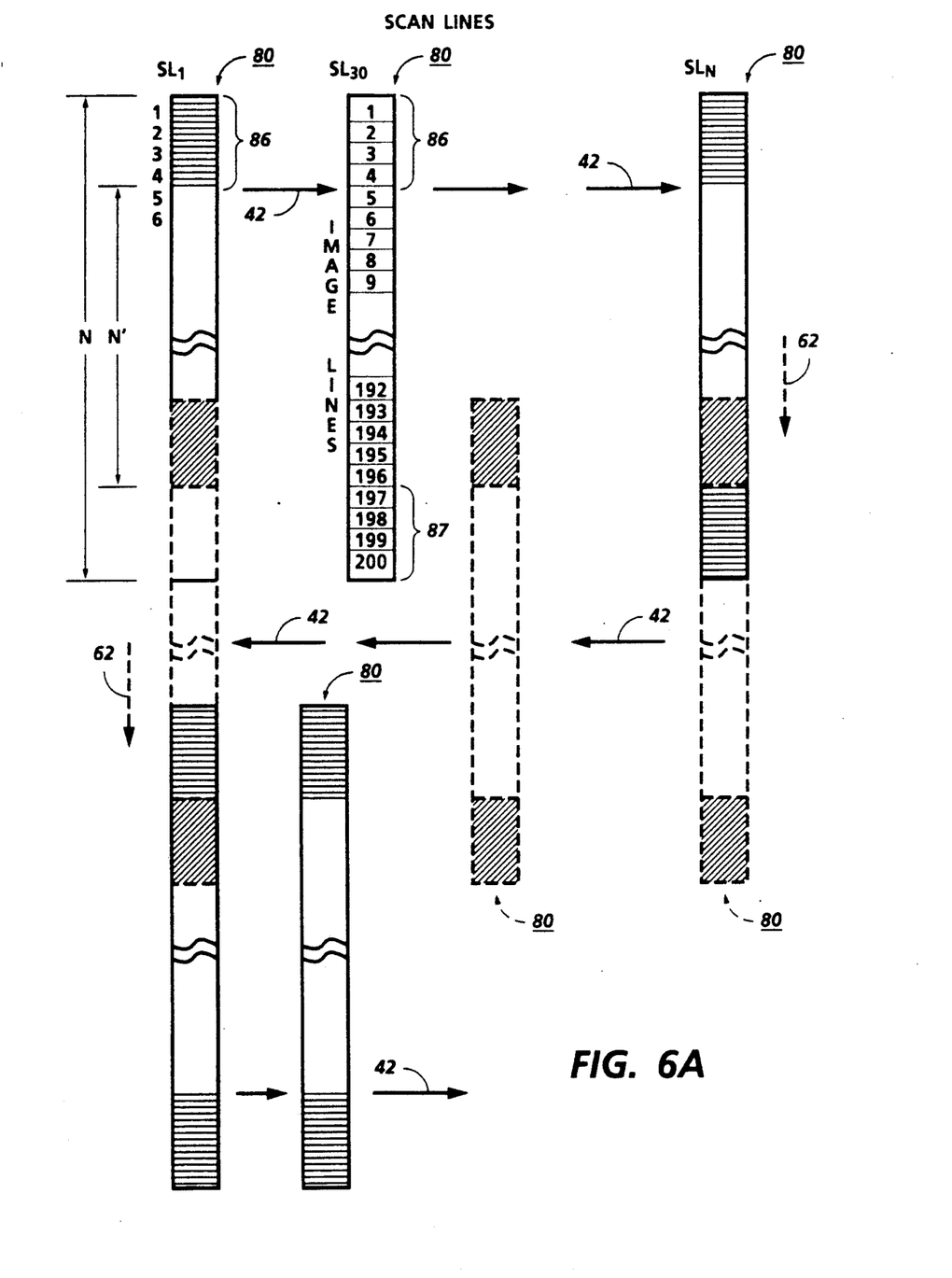
FIG. 6a is a schematic view depicting the scan line-image line-pixel relationship when descreening pixels using the slow scan context image processing of the present invention.
Figure 6B:
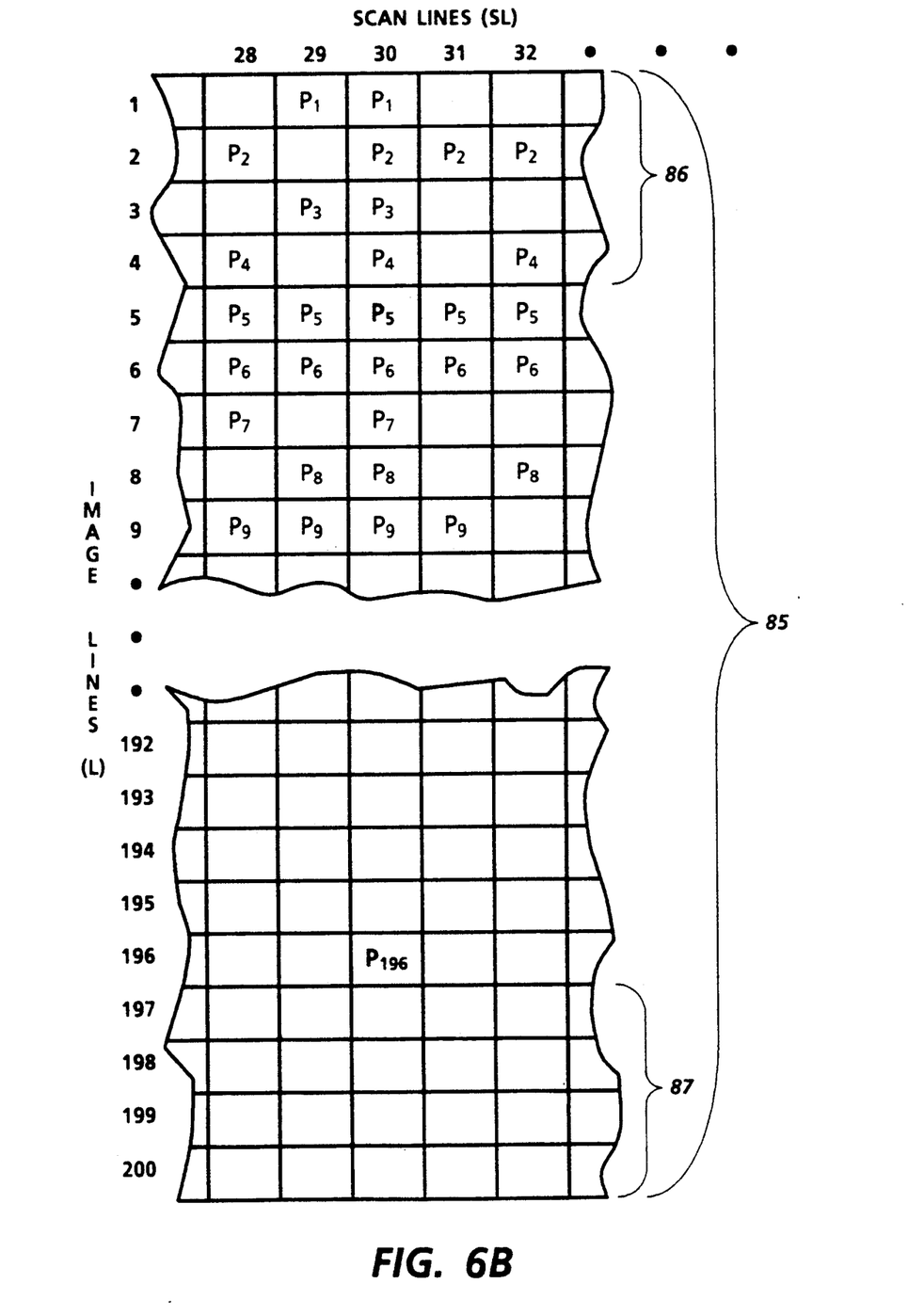
FIG. 6b is a schematic view illustrating a 5×9 descreening filter employing the slow scan context image processing of the present invention.

Referring particularly to FIGS. 6a and 6b and the examples depicted in these Figures, it will be understood that each pixel can be identified by the scan line (SL) and the image line (L) in which the pixel resides. In the example shown in FIGS. 6a and 6b, the pixel being descreened is pixel $P_5$ of scan line 30 ($SL_{30}$) and image line 5 ($L_5$). As shown in FIG. 6b, pixel $P_5$ and the four neighboring pixels (i.e., pixels $P_1$, $P_2$, $P_3$, $P_4$, and $P_6$, $P_7$, $P_8$, $P_9$) on each side of pixel $P_5$ in scan line 30 together with the positionally equivalent groups of 9 pixels (i.e., pixels $P_1$-$P_9$) in the two scan lines $SL_{28}$ and $SL_{29}$ preceding scan line 30 and the 2 scan lines $SL_{31}$ and $SL_{32}$ following scan line 30 are used. It will be understood that pixel $P_5$ is the first pixel in the block 85 of 192 image lines that is to be processed (since pixels $P_1$-$P_4$ are used for context purposes). As seen in FIG. 6a, pixel $P_5$ is in image line $L_5$ while the 4 pixels before pixel $P_5$ (i.e., $P_1$, $P_2$, $P_3$, $P_4$) are in image lines $L_1$, $L_2$, $L_3$, $L_4$, that comprise the overscanned area 86. The 4 pixels after pixel $P_5$ (i.e., $P_6$, $P_7$, $P_8$, $P_9$), the pixels of which will be subsequently processed, are in image lines $L_6$, $L_7$, $L_8$, $L_9$). Similarly, as seen in FIG. 6b, the neighboring pixels in scan lines $SL_{28}$, $SL_{29}$, $SL_{31}$, are obtained from buffers 130, 131, and 133 respectively, while those of scan line $SL_{32}$ are from the scan line currently output by pre-processing section 100.

For the next pixel $P_6$ in scan line 30, the group of neighboring pixels is made up of pixels $P_2$, $P_3$, $P_4$, $P_5$ on one side and pixels $P_7$, $P_8$, $P_9$, $P_{10}$ on the other side.

Similarly, as succeeding pixels in scan line 30 are processed, the group of pixels is, in effect, advanced by one for each pixel processed. As shown in FIG. 6b, where the last pixel $P_{196}$ in the line is processed, the neighboring pixels consist of pixels $P_{192}$, $P_{193}$, $P_{194}$, $P_{195}$ on one side and pixels $P_{197}$, $P_{198}$, $P_{199}$, $P_{200}$ on the other side. In this case, the pixels $P_{197}$-$P_{200}$ are the pixels in the overscan area 87.

Following processing of the last pixel, i.e., pixel $P_{196}$ in scan line 30, processing shifts to the first pixel $P_5$ of the next scan line 31 and continues until the last pixel $P_{196}$ of line 31 is processed. In processing scan line 31, pixels from neighboring scan lines $P_{29}$, $P_{30}$, and $P_{32}$, $P_{33}$ are used. Pixels in the other scan lines are similarly processed.

Where processing of the last pixel $P_{196}$ in the last scan line $SL_N$ is completed, carriage 40 with scanning array 80 is shifted downwardly in the mechanical slow scan direction shown by the arrow 62 and the pixels from the next block of 192 lines processed in the manner described. Since the mechanical fast scan direction is reversed, the scan lines are processed backwards starting with scan line $SL_N$ and continuing to line $SL_1$, at which point carriage 40 is shifted again in the mechanical slow scan direction to enable scanning and processing of the next block of 192 lines. In each shift of the carriage 40 in the mechanical slow scan direction, the last eight scan lines (i.e., lines $SL_{193-200}$) are rescanned by array 80 to provide image context.

Where scanner 10 is combined with a printer, such as described and shown, print head 90, which is mounted on carriage 40 and hence moves in unison with scanning array 80 is operable to make a print of the scanned image used the processed pixels P. As will be understood, suitable memory (not shown) may be provided to enable operation of print head 80 to be synchronized with scanning array 80.

Since the margins of a document typically comprise background images, i.e., white, pixels in the margins are not filtered.

It will be understood that other filter sizes and combinations other than that described may be used. Further, image signal processing circuits other than descreening filter may be contemplated.

While the invention has been described with reference to the structure disclosed, it is not confined to the details set forth, but is intended to cover such modifications or changes as may come within the scope of the following claims.

We claim:

1. Means to enable slow scan image context processing in a scanner-printer, comprising:
   (a) a scanning array for scanning a block consisting of a first preset number of lines of an input image on each pass to provide image signals representative of the image scanned;
   (b) a printing array for printing a second preset number of lines on a copy substrate using said image signals;
   (c) means supporting said scanning and printing arrays for bi-directional movement in a first direction parallel to said lines and in a second direction perpendicular to said lines;
   (d) the number of said first preset lines scanned by said scanning array being greater than the number of said second preset lines printed by said printing array whereby to provide extra lines of image signals before and after the image lines printed by said printing array so that there is provided image signals for slow scan context processing of said first preset lines before and after said extra lines of image signals.

2. In a scanner-printer, the combination of
(a) a movable scanning array having at least one row of sensors for scanning lines of an image bearing document to provide image signals representative of the image content of said document;
(b) first means supporting said scanning array for movement in a first direction with said row of sensors substantially perpendicular to said lines;
(c) a movable printing array having at least one row of printer elements for printing images on a substrate in accordance with the image signals output by said scanning array,
the number of printer elements in said row being less than the number of sensors in said scanning array;
(d) said sensors being segregated into a first group of sensors comprising a first preset number of lines at a first end of said scanning array and a second group of sensors comprising a second preset number of lines at a second end end of said scanning array, each of said first and second groups of sensors having a border with a third group of sensors therebetween, said third group of sensors comprising a third preset number of lines, the number of sensors in said third group of sensors being equal to the number of printer elements in said printing array;
(e) second means supporting said printing array for movement relative to a copy substrate in said first direction with the axis of said row of printer elements substantially perpendicular to said lines;
(f) third means supporting said scanning array and said printing array for movement in steps in a second direction perpendicular to said first direction, said steps being equal to said third group of lines; and
(g) image signal processing means for receiving the image signals output by said first, second, and third groups of sensors;
(h) said image signal processing means using the image signals from said first and second groups of sensors to provide context for processing the image signals from said third group of sensors adjacent the border of said third group of sensors with neighboring first and second groups of sensors whereby to enable processing of said image signals for printing by said printer elements.

3. The scanner-printer according to claim 2 in which the number of lines in said first and second groups of sensors are equal to one another.

* * * * *